March 24, 1970    W. VON STOESER ET AL    3,501,896
AUTOMATIC HEAT SEALING APPARATUS
Filed May 18, 1967      4 Sheets-Sheet 1
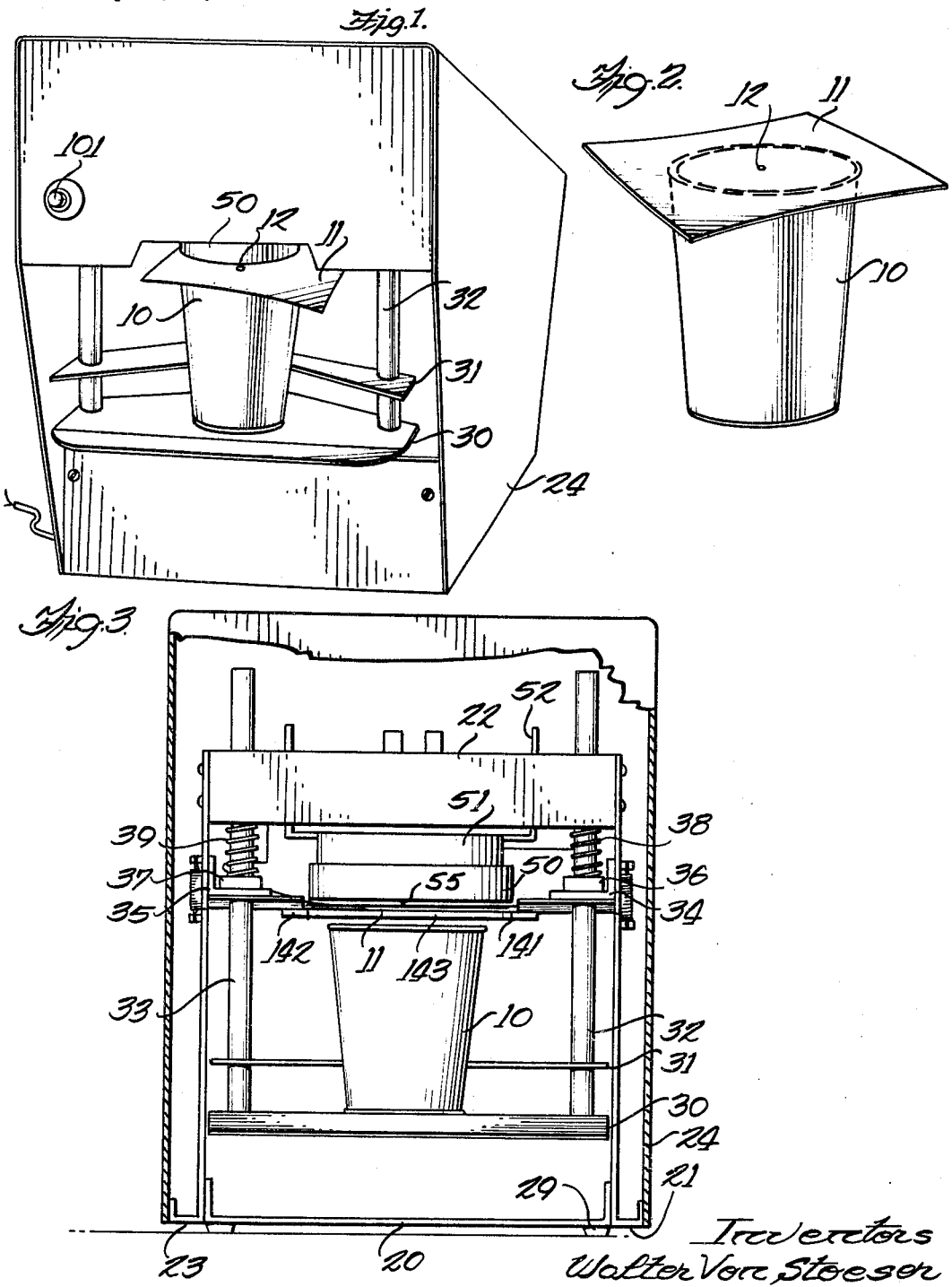

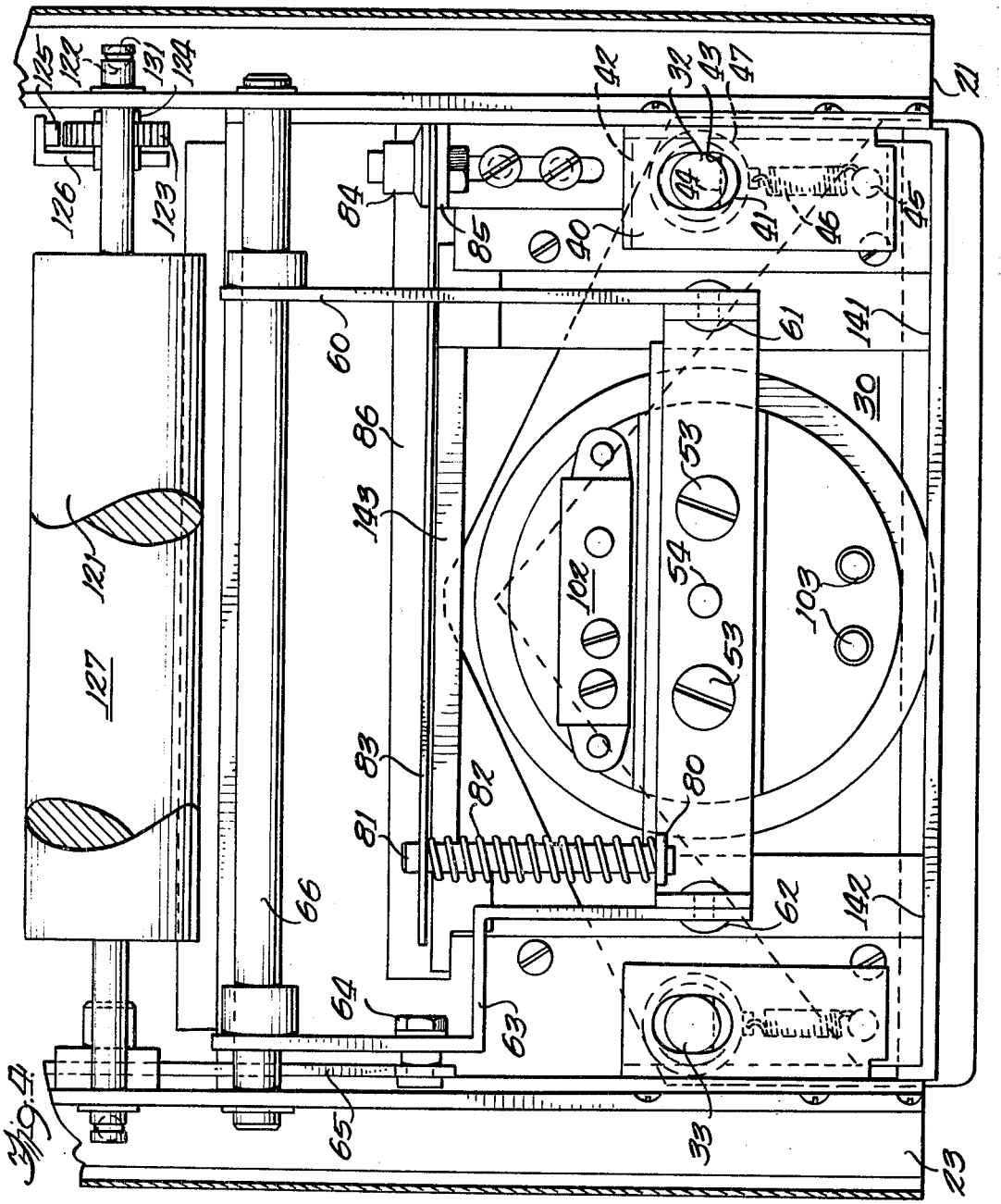

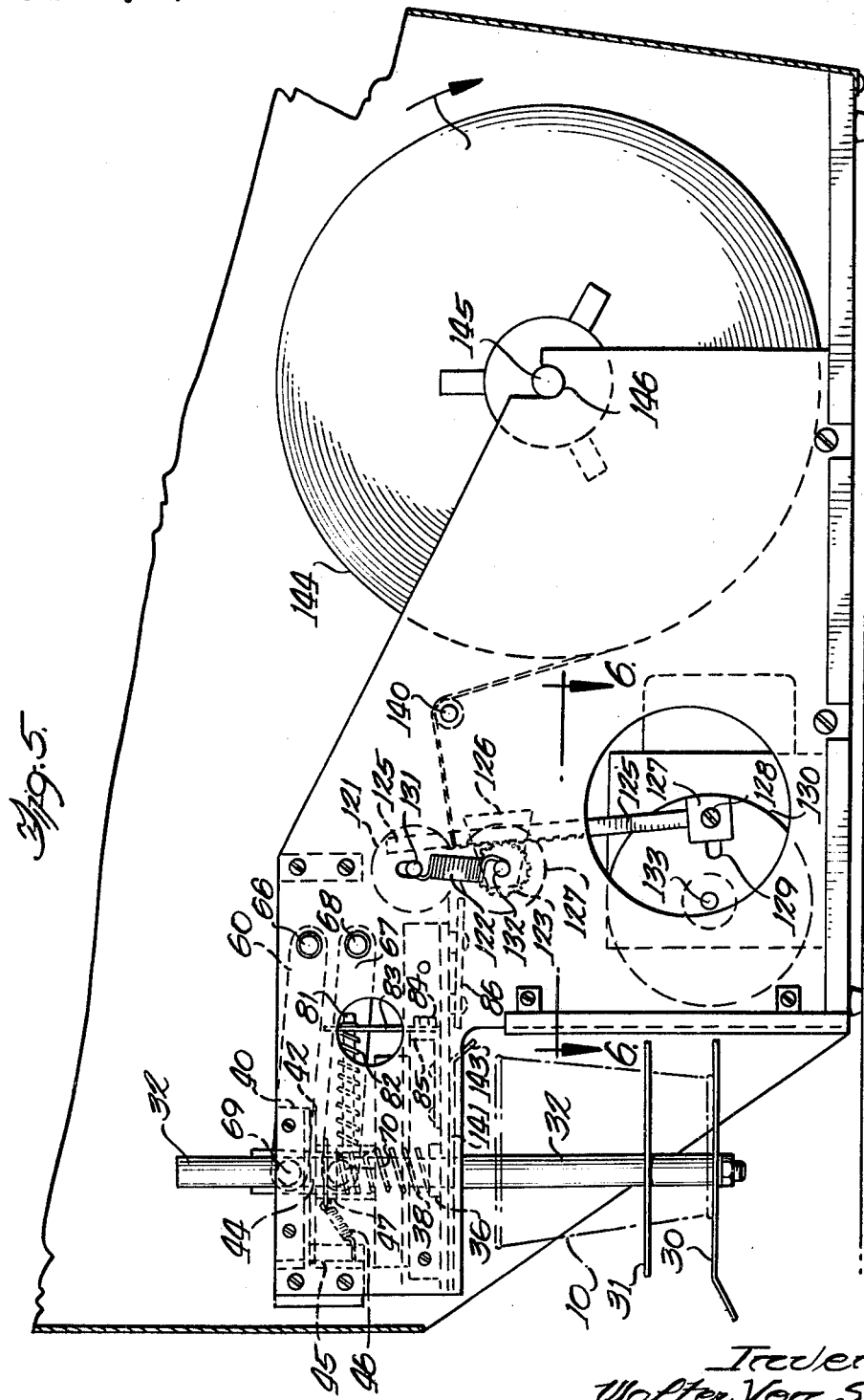

Inventors
Walter Von Stoeser
Louis Lawrence Laske
Thomas W. Speckman
Attorney

United States Patent Office

3,501,896
Patented Mar. 24, 1970

3,501,896
AUTOMATIC HEAT SEALING APPARATUS
Walter von Stoeser, Lake Villa, and Louis Lawrence Laske, Grays Lake, Ill., assignors to Vonco Products, Inc., Grays Lake, Ill., a corporation of Illinois
Filed May 18, 1967, Ser. No. 639,415
Int. Cl. B65b 51/14, 61/06
U.S. Cl. 53—329                7 Claims

ABSTRACT OF THE DISCLOSURE

A method of closing the open end of a container by heat sealing a thin sheet of material to the edge forming the open end wherein such edge is coated with a heat sealable substance. An apparatus to automatically effect such a seal upon actuating a motor driving a mechanical linkage wherein a flat heater plate in a raised position with film spaced closely beneath is lowered into engagement with the film, continuing such movement, cutting the film to appropriate size and engaging the film with the edge forming the open end of the container to provide a heat seal of the film to the edge of the container, returning the heater plate upward to the raised position, and positioning film in a close spaced position below the heater plate for the next cycle of operation.

BACKGROUND OF THE INVENTION

In association with vending machines and drive-in food services, it is desirable to apply a sealed closure or cover to food containers to protect the contents, avoid splash, and to retain the food or beverage in a sanitary condition. The importance and necessity of such covers is amplified by the increasing trend to transport food away from the point of purchase for consumption.

Presently most food containers carried away from the point of their purchase are closed with covers which are manually applied and are of the type which either snap inside of or over an upper lip of the container. Such covers present difficulties when they are not very carefully applied, sometimes falling into the food or beverage in the container. Some of the most commonly utilized covers at present seat into place below the upper edge of the container and when applied frequently force the contents of a filled container over the upper edge thus causing the contents to run down the outside of the container and necessitate manual wiping to maintain desired cleanliness. Further, special attention must be used when removing such covers or else the beverage or food in a reasonably full container will spill or splash on the consumer. Especially when hot drinks are concerned, this is a real hazard. Prior sealing methods, such as mentioned above, do not lend themselves to automated apparatus for efficiently effecting the sealed closure of a filled container.

It has been known to seal plastic film to the upper edge of a container of the same plastic heat sealable material to form a heat sealed cover. However, these methods have been restricted to use when both the film and container are made of the same heat sealable plastic material. Such methods have necessitated the use of a limited range of containers and have experienced difficulties arising from contraction and expansion of the sealed film due to the temperature of the contents of the container. The plastic film has the further disadvantage in that it will distort unevenly due to being non-conductive to heat, or will even melt through if subjected to slightly excessive heat. Further problems in handling arise due to the lack of rigidity of the plastic film and the difficulties encountered in cutting the plastic film by mechanical means.

It is a principal object of our invention to overcome the above disadvantages and to provide a fully automatic apparatus to furnish an efficient, economical and rapid means of sealing a durable film to the upper edge of a wide variety of containers thus providing an effective sealed closure.

SUMMARY

Surprisingly, we have discovered a method of closing the open end of a container with a film of dissimilar material comprising heating the film, lowering the film into engagement with the edge forming the open end of the container, retaining heated pressure engagement of the film to the edge to provide a heat seal of the film to the edge of the container, and removing such heated pressure; provided that one of the surfaces of the edge and the face of the film adjacent the edge is a heat sealable material. Very satisfactory seals have been effected using a metallic foil, such as aluminum, and a readily available polyolefin coated paper container. A preferred method utilizes a roll of metallic foil from which a suitable size piece may be cut during the lowering of the film into engagement with the top edge of the container. A metallic foil is preferred due to its heat conductance resulting in even heating, ability to withstand high temperatures without damage, high tensile strength when heated, and its suitability for cutting by mechanical means. A metallic foil may be evenly heated to relatively high temperatures and a superior seal is obtained in a very short time. Further, the metallic foil may be readily punctured for venting the closed container with minimum risk of further tearing.

The method of our invention is particularly suitable for the fully automatic apparatus of this invention for closing the open end of a container by heat sealing a film to the edge forming the open end of the container comprising in combination, a frame supporting a container support means upon which an open container may be placed, a resiliently supported heating means movable relative to the container support means, positioning means to position the film in close spaced relation to the heating means and between the heating means and container support means, cutting means to cut the film, and motor means driving linkage means to heating means, cutting means, and positioning means to automatically, upon activation of the motor means, move the heating means from a first position downwardly into engagement with the film and continuing such movement cutting the film with the cutting means and engaging the film with the edge forming the open end of the container, returning the heating means to said first position, and positioning film in said close spaced relation to the heating means. The rest position of the above cycle may be readily changed so that, for instance, the film is not advanced until the automatic apparatus is activated to prevent tampering with the film prior to sealing.

The method of our invention is applicable to a wide variety of combinations of materials such as paper containers coated with a heat sealable material and a metallic foil such as aluminum, a metallic container such as aluminum and a heat sealable plastic film or a paper or metallic film coated with a heat sealable plastic, etc.

Any heat sealable material may be utilized to effect the heat seal. Suitable heat sealable plastics include cellulosics such as cellulose acetate, olefin polymers such as polyethylene, polypropylene, styrene, vinylidene fluoride, vinylidene chloride, vinyl chloridepolyvinyl acetate copolymer, and condensation polymers such as polyamides, polyurethane elastomers, and polycarbonates from the reaction of bisphenol and phosgene.

It is an object of our invention to provide an improved method and automatic apparatus for closing the open end of a container by heat sealing a film to the top edge of the container forming the opening.

Another object is to provide a method and automatic apparatus for closing the open end of a container with a film of dissimilar material than that of the container wherein one of the edge forming the open end of the container and the lower side of such film is coated with a heat sealable material.

A further object is to provide a method and automatic apparatus for closing the open end of a paper container coated with a polyolefin by heat sealing a metallic foil across such opening.

A still further object is to provide an automatic apparatus which, upon actuation, automatically advances film into a closely spaced relation below a heater plate, lowers the heater plate from a raised position into engagement with the film and in continuing movement toward the open end of the container cuts the film to appropriate size, engages the film with the top edge of the cup under heat and pressure to form a heat seal, and returns the heater plate to the aforesaid raised position as a complete operative cycle.

BRIEF DESCRIPTION OF THE DRAWINGS

These and other objects and advantages of the invention will become more apparent from the ensuing description and claims, when taken with the accompanying drawings, in which:

FIGURE 1 is a perspective view of an apparatus embodying the principles of the invention;

FIGURE 2 is a perspective view of a container with a top closure made according to the method and apparatus of the invention;

FIGURE 3 is a cutaway front elevation of the apparatus of FIGURE 1;

FIGURE 4 is a top view of the apparatus of FIGURE 1 with the top of the exterior housing cut away;

FIGURE 5 is a right-hand side elevation of the apparatus of FIGURE 1 with the side of the exterior housing cut away;

DESCRIPTION OF THE PREFERRED EMBODIMENTS

Figure 6:
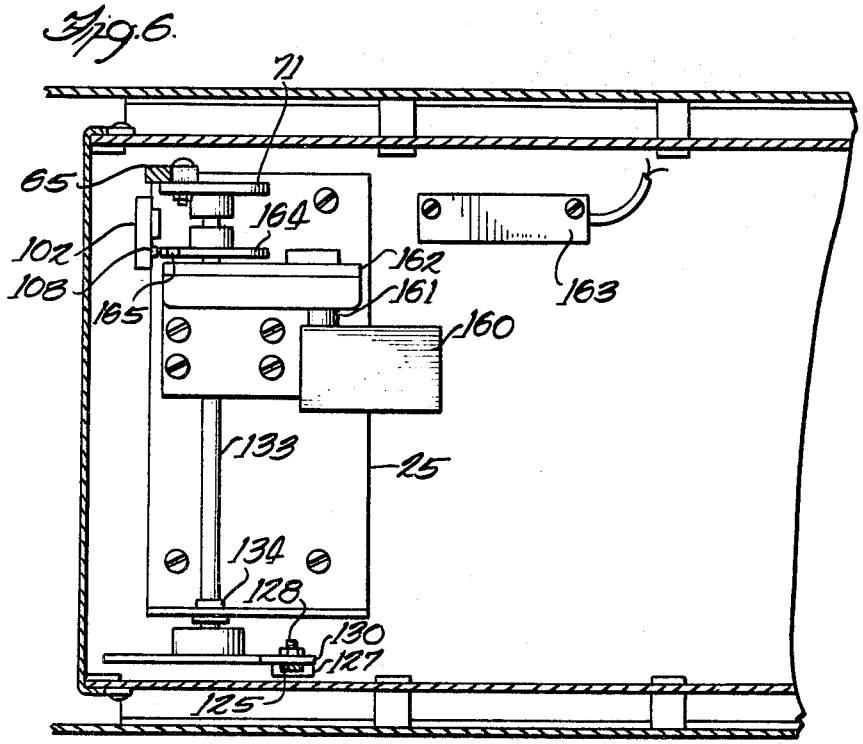
FIGURE 6 is a section view generally as seen along line 6—6 in FIGURE 5.

Preferred embodiments of the apparatus of our invention are shown in the drawings.

Briefly, the general operation of the apparatus may be seen in FIGURE 1 wherein cup 10 is placed on platform 30 and positioned by guide 31. Upon actuation of the apparatus by pressing switch 101, heating plate 50 moves downwardly engaging film 11 against the top edge of cup 10 thus effecting a heat seal. The hole 12 in the film may be desirable when closing containers housing hot contents.

Referring to the drawings, firstly FIGURE 3, a heat sealing device embodying the principles of the invention is shown, which device includes a frame means having a pair of vertical side walls 21 and 23, a base plate 20, and a top plate 22, the elements 20 and 22 serving to maintain the side walls 21 and 23 in a vertically spaced relation. Rubber buttons 29 may be affixed to each corner of the base plate to furnish resilient non-skid mounting of the apparatus. Cover 24 is placed over the entire apparatus and is completely removable for general access.

Platform 30 and guide 31 are readily adjustable in vertical position by parallel rods 33 and 32 which slide and lock in variable positions with respect to the frame. This permits rapid and easy adjustment to accommodate containers of different heights. Referring to FIGURES 3, 4 and 5, it is seen that each of rods 32 and 33 have the same locking device which will be described by reference to rod 32. Rod 32 extends through lower bracket 34 and slot 41 in upper bracket 40 which brackets are attached rigidly to side wall 21. Floating plate 42, through which rod 32 passes at slot 43, is beneath bracket 40 and is urged against bracket 40 by spring 38 extending from lower bushing 36 against lower bracket 34 to upper bushing 47 against upper bracket 40. Floating plate 42 is urged forward by spring 46 which is fastened to fixed pin 45. It should be noted that slot 41 is square at the forward end to accommodate notch 44 in rod 32. Thus, it is seen that with several notches such as notch 44, rod 32 may be firmly positioned in a selection of vertical positions by simply moving platform 30 forward which pivots rod 32 in bracket 34 and disengages notch 44 so that the entire container support assembly may be raised, lowered, and even completely removed from the apparatus without removing, or even turning, any screws or pins. The ease of removal of the container support means from the apparatus is important from the standpoint of ease of cleaning, while the height adjustment is important to permit use of containers of widely varying heights.

In spaced relation above and approximately parallel to platform 30 is a resiliently mounted heating means, as best seen in FIGURES 3 and 4, comprising a heater plate 50 mounted to heater head 51 which is resiliently mounted to heater head bracket 52 by shoulder screws 53 holding heater head 51 against ball bearing 54 seated against bracket 52. Electrical resistance heater 103 is within heater head 51 and regulated by adjustable thermostat 102 positioned adjacent heater head 51. The temperature of the heater plate 50 will depend upon the type of material of which the container and the film are made and the type of heat sealing material utilized. Excellent results have been obtained, for example, using aluminum foil and polyolefin coated paper cups with a heater plate temperature of about 350° to 420° F. Heater plate 50 is readily detachable from heater head 51 to permit use of a heater plate having a flat bottom surface, which is most desirable when metallic foil is utilized, or a heater plate having a ring-like lower surface which will engage the film only in the region of the upper edge of the container. It is preferred to use a heater plate having a flat bottom surface to most rapidly preheat a metallic heat conducting film to provide the most rapid operational cycle of the apparatus. However, when using coated paper or plastic film it is preferred to use a heater plate having a ring-like lower surface so as to apply heat only to the sealing region to prevent damage or distortion to the major portion of the film by retaining it at lower temperature. The resilient mounting of the heating means accommodates slight variations in container heights and edge contours.

When sealing containers in which the contents is hot, it is desirable to puncture a hole 12 to relieve pressure which may be built up within the container. This may be very easily achieved in our apparatus by pointed rod 55 which extends through hole 56 in heater plate 50 and heater head 51. Rod 55 is to be retractable when a hole is not desired and readily positioned protruding from the surface of heater plate 50 when a vent hole is desired.

Cutting means are shown in FIGURES 4 and 5 comprising knife 83 pivotally mounted at one end to bracket 85, which is adjustably mounted to bracket 34 by shoulder screw 84, and movably mounted at the other end to shoulder pin 81 which is rigidly mounted to heater head bracket 52 by bracket 80. Spring 82 encircling pin 81 urges knife 83 against the edge of bottom knife plate 86 to facilitate sharp cutting of the film. It can be seen that action of the cutting means is effected by downward movement of heater head bracket 52 and the same downward movement of the end of knife 83 linked to pin 81 thus moving knife 83 pivotally about shoulder screw 84 which is rigidly attached to the frame 21.

Positioning means, as shown in FIGURE 5, for a roll of film 144 include shaft 145 journalled for rotation in groove 146 at the rear of frame side wall 21. Shaft 145 is provided with a brake to prevent rotary movement of roll 144 unless urged by positioning means. Extending in parallel relation between side walls 21 and 23 are upper drive roller 121 having central shaft 131 and lower drive roller 127 having central shaft 132. Shaft 132 is journalled for rotation in side walls 21 and 23, while shaft 131 is rotatably mounted in a slot in side walls 21 and 23 whereby roller 121 may be moved away from roller 127 to thread the film through the positioning means. Spring means 122 maintained in tension urge roller 121 into engagement with roller 127.

Spur gear 123 is mounted to shaft 132 through clutch 124 which permits only counterclockwise rotation (FIGURE 5) by gear 123 to be transmitted to shaft 132. Spur gear 123 is driven by rack 125 which is retained in engagement with spur gear 123 by pivotally mounted guide 126.

Film is urged from roll 144 by the action of upper drive roller 121 and lower drive roller 127 on the film which is threaded between the drive rollers at their point of contact. The amount of film taken from roll 144 is directly related to the extent of rotation of the rollers which in turn is dependent upon the travel of rack 125. The travel of rack 125 is easily adjustable by movement of the lower end of rack 125 in slot 129 of feed cam 130. The lower end of rack 125 rotatably coupled to the feed cam by screw 128 and spacer block 127.

Film guide roller 140, parallel to and to the rear of drive rollers 121 and 127 assist in guiding the film from roll 144 to the drive rollers.

Film is guided from the drive rollers into position beneath the heating means by passing over bottom knife plate 86 and resting on film support means having lip 143 extending the full transverse width of the film and side trays 141 and 142 which are adjustable to accommodate film of varying widths.

Motor means are shown in FIGURE 6 comprising an electric motor 160 having motor shaft 161 directly connected to speed reducer 162 driving through power shaft 133. Shaft 133 passes through motor bracket 25 at bearing 134 and is adjustably fastened to the center of feed cam 130. Drive cam 71 is securely fastened to the other end of shaft 133. Control cam 164 is adjustably mounted to shaft 133. Control cam 164 has notch 165 in its periphery in which rider 108 of normally open microswitch 102 may extend to open the electrical circuit to the motor. Thus, by changing the angular position of notch 165 relative to shaft 133, the cycle of the apparatus may be stopped at any desired point. For example, the film may be advanced by the first operation of the cycle, or the film may be advanced by the last operation of the cycle to permit preheating of the film if desired.

Figure 7:
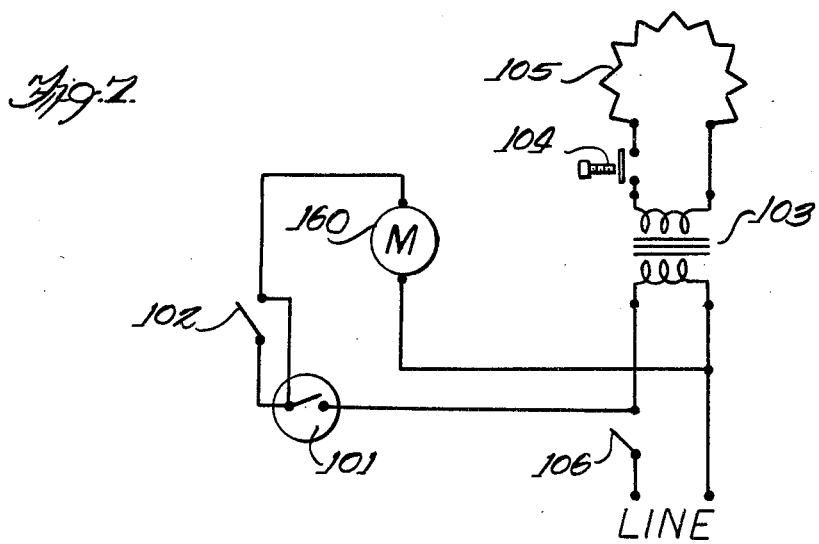
FIGURE 7 is an electrical circuit diagram as used for powering certain elements in the apparatus of FIGURE 1.

An electrical circuit for operation of the apparatus is shown in FIGURE 7. A main switch 106 is arranged in one of the electrical input lines to provide current flow through transformer 103, if necessary, and thermostat 104 into electrical resistance heater 105. Motor operation is initiated by depressing normally open pushbutton switch 101 sufficiently long so that micoswitch 102 closes by action of control cam 164. It should be noted that when the main switch is closed the heater is activated. This is desirable since a preferred cycle if operation positions film below the heater plate as the final step. This allows a metallic film to be preheated while the apparatus is not in actual operation. Preheating is especially desirable to alleviate wrinkles when using metallic foil.

Linkage means comprises mechanical linkage between the motor and the automatically movable components of the apparatus including the heating means, cutting means and positioning means.

The heating means and cutting means driving linkage is seen in FIGURES 4 and 5 comprising drive link 65 rotatably fastened at its lower end to drive cam 71 and rotatably fastened at its upper end by shoulder screw 64 to link 63, one of four links in a parallel type linkage system. One pair of linkages is located on each side of heater head bracket 52. Upper links 63 and 60 are rotatably supported at one end by shaft 66 affixed to side walls 21 and 22, while the other ends of the links are rotatably attached to heater head bracket 52 by pins 62 and 61, respectively. The lower links are likewise rotatably supported at one end by shaft 68, while the other ends are rotatably attached to heater head bracket 52 so that the links on each side of the heater head bracket are in parallel relation in all positions of movement. Thus, angular movement of drive cam 71 is transmitted as linear movement by drive link 65 to the parallel type linkage system which raises and lowers heater head bracket 52. By this movement of the heater head bracket heater plate 50 will remain parallel to the platform 30 in all positions of vertical movement.

As explained previously, the cutting means is moved by action of the heater head bracket 52.

As previously pointed out, the positioning means is driven by rack 125 attached to the power shaft 133 through feed cam 130.

The shape of the drive cam 71 provides for relatively rapid raising and lowering movement of the heating means with a dwell time in the lowered position providing for good heat sealing action.

It should be noted that the sequence of movement of the positioning means relative to movement of the heating means may be changed by simply rotating feed cam 130 on shaft 133 with respect to drive cam 71. Thus, the film may be positioned for preheating while the apparatus is in a waiting position or advancement of the film may be effected upon actuation of a cycle of the apparatus to prevent preheating.

It is seen that the embodiments described in detail achieve the objects set forth above.

The operator is required only to place a cup on platform 30 and depress pushbutton switch 101. Depression of switch 101 activates the motor causing rotation of control cam 164 and closing of the electrical circuit to the motor for one complete cycle. Operation of the motor causes rotation of drive cam 71 which transmits linear movement through drive link 65 to the parallel type linkage system lowering heater plate 50 into engagement with the film and continuing such downward travel to engage the film with the upper edge of the container under heat and pressure to cause a heat seal of the film to the upper edge of the container. The downward movement of the heater means causes downward pivotal movement of knife 83 cutting the film. The heater plate 50 is then automatically raised to its upper position and rack 125 begins upward movement, caused by rotation of feed cam 130, to rotate drive rollers 121 and 127 which advance film into closely spaced position beneath heater plate 50. Switch 102 is then opened by rider 108 falling into notch 165 of control cam 164 stopping the motor and completing the automatic cycle. The film is preheated by heater plate 50 while the apparatus is not functioning in the automatic sealing operation.

While certain operative forms of the invention have been shown and described, it should be understood that these showings and descriptions should be taken in an illustrative or diagrammatic sense only. There are many modifications in and to the invention which will fall within the scope and spirit thereof and will be apparent to those skilled in the art. The scope of the invention should be limited only by the scope of the hereinafter appended claims.

We claim:

1. An automatic apparatus for closing the open end of a container by heat sealing a film to the edge forming the open end of the container comprising in combination, a frame, a platform container support means supported by said frame, a resiliently mounted heating means linearly movable relative to said container suport means in a plane at approximately 90° to the plane of said platform, cutting means movable relative to said container support means, positioning means to position said film in close spaced relations below said heating means, motor means, and linkage means between said motor means and said heating means, cutting means, and positioning means to automatically, upon actuation of said motor means move said positioning means to position film in said close spaced relation below said heating means, move said heating means linearly downwardly into engagement with said film, move said cutting means to cut said film, and continuing said downward linear movement to engage said film with said edge to provide a heat seal of said film to said edge, and raise said heating means; said linkage means between the motor means and heating means comprising parallel links.

2. The automatic apparatus of claim 1 wherein said container support means comprise a horizontal platform rigidly connected to a pair of parallel vertical rods having a series of notches at the upper end, a pair of lower brackets rigidly attached to said frame means having openings through which said rods loosely pass at about their midpoint, a pair of upper brackets rigidly attached to said frame means having slots through which said rods pass, a pair of floating plates beneath said upper brackets having openings through which said rods pass, a pair of springs attached at one end to said plates and at the other end to said frame means so as to urge said plates forward, and a pair of springs circumferentially about said rods urging said plates upward against said upper brackets so that a pair of said notches engage the forward end of the slots in said upper brackets to firmly hold the container support means in position which is vertically adjustable by moving said platform forward pivoting said rods at said lower brackets disengaging said notches, moving the platform in a vertical direction to the desired position and then moving the platform backward engaging a pair of notches with said upper brackets.

3. The apparatus of claim 1 wherein said positioning means comprises an upper drive roller rotatably secured by said frame, a lower drive roller rotatably secured by said frame beneath and in parallel contact with said upper drive roller, a clutch mounted to said lower roller on one side to transmit only unidirectional rotation to said roller, a spur gear mounted to the other side of said clutch, and a rack maintained in engagement with said gear.

4. The apparatus of claim 1 wherein said linkage means comprises a drive cam transmitting movement to said heating means and cutting means, and a feed cam transmitting movement to said positioning means and wherein both of said cams are attached to a single motor means and are rotatably adjustable relative to each other thereby controlling the sequence of movement of said heating and cutting means relative to said positioning means.

5. The apparatus of claim 1 wherein said resiliently mounted heating means comprises a heater head, a heater plate removably mounted to the lower side of said heater head, a heater head bracket resiliently mounted to the upper side of said heater head, screws urging said heater head toward said bracket, a spherical ball seated against the lower side of said bracket and in contact with the upper surface of said heater head to provide a resilient mounting, an electrical resistance heater within said heater head, and an adjustable thermostat positioned adjacent said heater head to control said heater.

6. The apparatus of claim 5 wherein said heater plate has a flat lower surface.

7. The apparatus of claim 5 wherein said heater plate has a ring-like lower surface.

References Cited

UNITED STATES PATENTS

| | | | |
|---|---|---|---|
| 3,112,587 | 12/1963 | Anderson et al. | 53—296 X |
| 3,286,437 | 11/1966 | Cole | 53—296 |
| 3,345,797 | 10/1967 | Von Stoeser | 52—297 X |
| 3,345,798 | 10/1967 | Sternau | 53—296 X |
| 955,172 | 4/1964 | Great Britain. | |

THERON E. CONDON, Primary Examiner

R. L. SPRUILL, Assistant Examiner

U.S. Cl. X.R.

53—296